US008965176B2

(12) United States Patent
Kabuto

(10) Patent No.: US 8,965,176 B2
(45) Date of Patent: Feb. 24, 2015

(54) VIDEO DISPLAYING SYSTEM AND REPRODUCING APPARATUS

(75) Inventor: Nobuaki Kabuto, Kunitachi (JP)

(73) Assignee: Hitachi Maxell, Ltd., Osaka (JP)

( * ) Notice: Subject to any disclaimer, the term of this patent is extended or adjusted under 35 U.S.C. 154(b) by 231 days.

(21) Appl. No.: 13/158,975

(22) Filed: Jun. 13, 2011

(65) Prior Publication Data

US 2012/0033935 A1    Feb. 9, 2012

(30) Foreign Application Priority Data

Aug. 6, 2010 (JP) ................. 2010-176921

(51) Int. Cl.
| | | |
|---|---|---|
| H04N 9/80 | (2006.01) |
| H04N 9/82 | (2006.01) |
| H04N 5/775 | (2006.01) |
| H04N 21/41 | (2011.01) |
| H04N 21/426 | (2011.01) |
| H04N 21/432 | (2011.01) |
| H04N 21/44 | (2011.01) |

(52) U.S. Cl.
CPC .............. *H04N 9/8227* (2013.01); *H04N 5/775* (2013.01); *H04N 21/4122* (2013.01); *H04N 21/42646* (2013.01); *H04N 21/4325* (2013.01); *H04N 21/44* (2013.01)
USPC ....................................................... 386/241

(58) Field of Classification Search
CPC ........ G06F 4/14; H04N 5/775; H04N 9/8227; H04N 21/00; H04N 13/0005; H04N 21/4325
See application file for complete search history.

(56) References Cited

U.S. PATENT DOCUMENTS

| | | | |
|---|---|---|---|
| 2005/0068346 A1* | 3/2005 | Ogawa et al. ............... 345/699 |
| 2006/0269226 A1 | 11/2006 | Ito et al. |
| 2007/0230909 A1* | 10/2007 | Mukaide et al. ............ 386/96 |
| 2011/0085029 A1* | 4/2011 | Noguchi .................... 348/58 |
| 2012/0275765 A1* | 11/2012 | Ikeda et al. ............... 386/241 |

FOREIGN PATENT DOCUMENTS

JP    2003-333624    11/2003

OTHER PUBLICATIONS

Chinese Office Action issued in Chinese Patent Application No. CN 201110148841.3 dated Sep. 4, 2013.

* cited by examiner

*Primary Examiner* — Huy T Nguyen
(74) *Attorney, Agent, or Firm* — McDermott Will & Emery LLP

(57) ABSTRACT

When reproducing 3D contents, a video signal reproducing apparatus connected to a 3D display device of various 3D display schemes provides a guide display or a guide voice conformed to each of the 3D display schemes. Viewing requirements concerning the 3D display scheme of the 3D display device are transmitted to the video signal reproducing apparatus. When reproducing contents, the video signal reproducing apparatus is configured to conduct suitable guide display or voice guide on the basis of viewing requirements concerning the 3D display scheme.

10 Claims, 12 Drawing Sheets

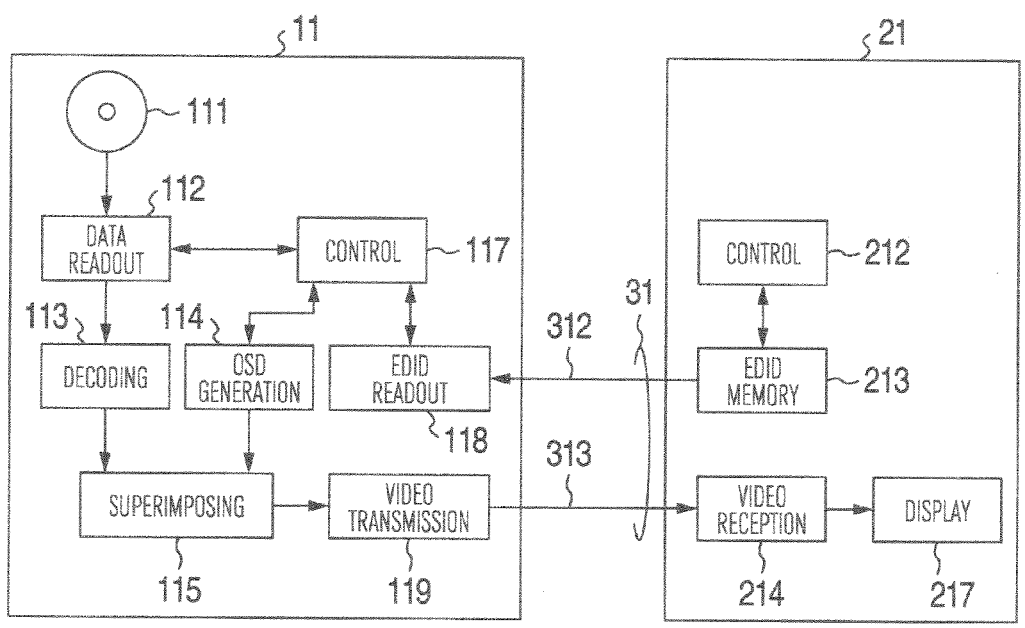

FIG.2

| Bit<br>Byte # | 7 | 6 | 5 | 4 | 3 | 2 | 1 | 0 |
|---|---|---|---|---|---|---|---|---|
| 0 | Vender-specific tag code (=3) | | | Length (=N) | | | | |
| 1-3 | 24-bit IEEE Registration Identifier (0x00C03) | | | | | | | |
| ..... | ................ | | | | | | | |
| p | 3D_present | 3D_Multi_present | | Image_Size | | Condition_to_see_3D | | Reserved (0) |
| ..... | ..................... | | | | | | | |

FIG.3

| Condition_to_see_3D [1,0] | Description |
|---|---|
| 00 | No Information (including unknown) |
| 01 | Put glasses to see 3D |
| 10 | Not need glasses to see 3D, but viewing area is small. (ex. Autostereoscopic display) |
| 11 | Not need glasses to see 3D, but viewing area is wider. (ex. Multi view display) |

FIG.5

| Condition_to_see_3D [1,0] | Description |
|---|---|
| 00 | No Information (including unknown) |
| 01 | Need user setting to see 3D other than glasses |
| 10 | No user action to see 3D |
| 11 | Need glasses to see 3D |

FIG.7

| Byte # \ Bit | 7 | 6 | 5 | 4 | 3 | 2 | 1 | 0 |
|---|---|---|---|---|---|---|---|---|
| 0 | Vender-specific tag code (=3) | | | | Length (=N) | | | |
| 1-3 | 24-bit IEEE Registration Identifier (0x00C03) | | | | | | | |
| ..... | ................... | | | | | | | |
| p | 3D_present | 3D_Multi_present | | Image_Size | | 3D_Display_present | Reserved (0) | Reserved (0) |
| ..... | ................... | | | | | | | |
| q | 2D_VIC_order_L | | | | 3D_Structure_L | | | |
| q+1 | 3D_Display | | | | | | | |
| q+2....N | Reserved (0) | | | | | | | |

FIG.8

| Name | | Value | Description |
|---|---|---|---|
| 3D_display_present | | 0 | "3D_display" Byte is not present |
| | | 1 | "3D_display" Byte is present |
| 3D_display | | | |
| | [7] Glasses | 0 | Not use glasses |
| | | 1 | Need glasses |
| | [6,5] Multi_view | 00 | Stereoscopic display or under 4 view points |
| | | 01 | 4 to 7 view points |
| | | 10 | 8 to 15 view points |
| | | 11 | 16 or more view points |
| | [4,3] Valid_3D_display | 00 | Unknown |
| | | 01 | Always 3D display state during the reception of 3D video signal. |
| | | 10 | Tentatively not 3D display state even if receiving 3D video signal. |
| | | 11 | Tentatively 3D display state during the reception of 3D video signal |
| | [2,1,0] Reserved | 000 | Shall set "000" |

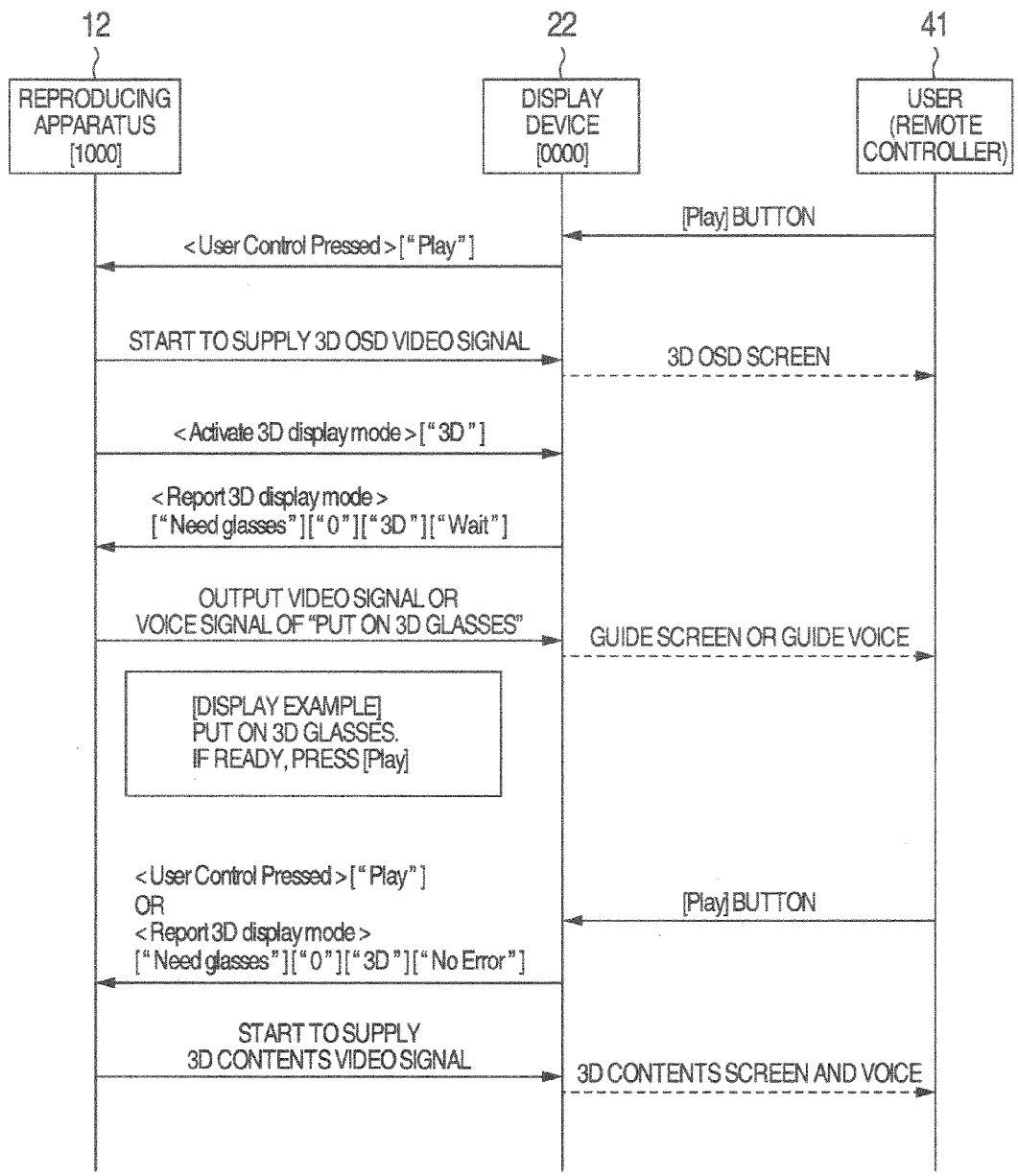

FIG.11

| Opcode | Parameters | Parameter description | Response |
|---|---|---|---|
| <Activate 3D display> | [3D activate] | The requested display mode | <Report 3D display> |
| <Report 3D display> | [3D mode] | The current display mode | - |

FIG.12

| Name | | Range Description | | Length | Purpose |
|---|---|---|---|---|---|
| [3D activate] | | "2D" | 0 | 1 byte | Set 2D display mode |
| | | "3D" | 1 | | Set 3D display mode |
| | | "No change" | 3 | | A source wants to know the TV status. |
| [3D mode] | | [3D Glass] [Multi View] [3D setting] [3D Error] | | 1 byte | |
| | [3D Glass] | "Not need glasses" | 0 | 1 bit | |
| | | "Need glasses" | 1 | | |
| | [Multi View] | (The number of multi view) -2 | | 4 bits | Stereoscopic display takes "0". It takes "15" when display has 17 or more view. |
| | [3D setting] | "2D" | 0 | 1 bit | Display at 2D mode |
| | | "3D" | 1 | | Display at 3D mode |
| | [3D Error] | "No error" | 0 | 2 bits | Continue 3D video |
| | | "Wait" | 1 | | Wait to play 3D contents till the reception of "No error". ex. TV is encouraging an user to put on glasses. |
| | | "no 3D video" | 2 | | No 3D video detected |
| | | "Other error" | 3 | | |

VIDEO DISPLAYING SYSTEM AND REPRODUCING APPARATUS

INCORPORATION BY REFERENCE

The present application claims priority from Japanese application JP2010-176921 filed on Aug. 6, 2010, the content of which is hereby incorporated by reference into this application.

BACKGROUND OF THE INVENTION

The present invention relates to transmission and reception of a video signal. In JP-A-2003-333624, the problem to be solved is to "enable a user to enjoy a 2D displayed image and a 3D displayed image respectively from the first" And its solution is to provide a discrimination part for discriminating which of an image for 2D display and an image for 3D display application data to be displayed on a display part is and display a discrimination result in the discrimination part before display of the application data on the display part.

In "High-Definition Multimedia Interface Specification Version 1.4a Extraction of 3D Signaling Portion," published by HDMI, LLC, http://www.hdmi.org/manufacturer/specification.aspx, a transmission method of a 3D video signal of HDMI (abbreviation of High-Definition Multimedia Interface, trademark of HDMI Licensing, LLC) is described.

According to JP-A-2003-333624, "as a technique for conducting 3D display, there is a scheme which enables stereoscopy by using special glasses or a parallax barrier scheme or a lenticular lens scheme which enables autostereoscopic view" and "for stereoscopically viewing a 3D displayed video, it is necessary for the user to put on special glasses for 3D viewing or conduct an action for adjusting a viewing position to stereoscopically view the 3D displayed video." As described in this way, adjustments according to respective 3D display schemes become necessary to suitably view the 3D displayed video.

JP-A-2003-333624 intends for an apparatus obtained by integrating a 3D display device and a video signal reproducing apparatus of "an electronic video recording and playback device having a display device capable of recording and reproducing a 3D video" as one body. Therefore, a 3D display scheme of the 3D display device is determined beforehand. With respect to precautions concerning viewing of a 3D displayed video, therefore, the video signal reproducing apparatus has a configuration which displays only predetermined precautions concerning the 3D display.

If the 3D display device and the video signal reproducing apparatus are separated from each other, then the video signal reproducing apparatus cannot discriminate the 3D display scheme of the display device connected to the video signal reproducing apparatus and there is a fear that the video signal reproducing apparatus might not be able to output the precautions concerning viewing of the 3D displayed video to the 3D display device.

Furthermore, a method for transmitting a 3D video signal from the video signal reproducing apparatus to the 3D display device is disclosed in JP-A-2003-333624. However, it is not considered to output the precautions concerning viewing of the 3D displayed video from the video signal reproducing apparatus to the 3D display device.

SUMMARY OF THE INVENTION

According to an aspect of the present invention, the above-described problems are solved by a configuration in which when reproducing contents including a 3D video in a reproducing apparatus, the reproducing apparatus reads out information concerning a 3D video display scheme retained by a display device and outputs video data or voice data concerning 3D video viewing to the display device on the basis of the information concerning a 3D video display scheme.

According to the above-described configuration, it becomes possible to promote suitable viewing of 3D contents and it is possible to provide an apparatus which is convenient for the user to use.

Other objects, features and advantages of the invention will become apparent from the following description of the embodiments of the invention taken in conjunction with the accompanying drawings.

BRIEF DESCRIPTION OF THE DRAWINGS

FIG. 1 is a block diagram showing an example of a video transmission system;

FIG. 2 is a table showing an example of a form of exchange information in a video transmission system;

FIG. 3 is a table showing an example of contents of exchange information in a video transmission system;

FIG. 5 is a table showing an example of contents of exchange information in a video transmission system;

FIG. 7 is a table showing an example of a form of exchange information in a video transmission system;

FIG. 8 is a table showing an example of contents of exchange information in a video system according to an embodiment;

FIG. 10 is a diagram showing an example of transmission and reception of a message in a video transmission system;

FIG. 11 is a table showing an example of a message in a video transmission system;

FIG. 12 is a table showing an example of an argument of a message in a video transmission system;

DESCRIPTION OF THE EMBODIMENTS

Figure 4:
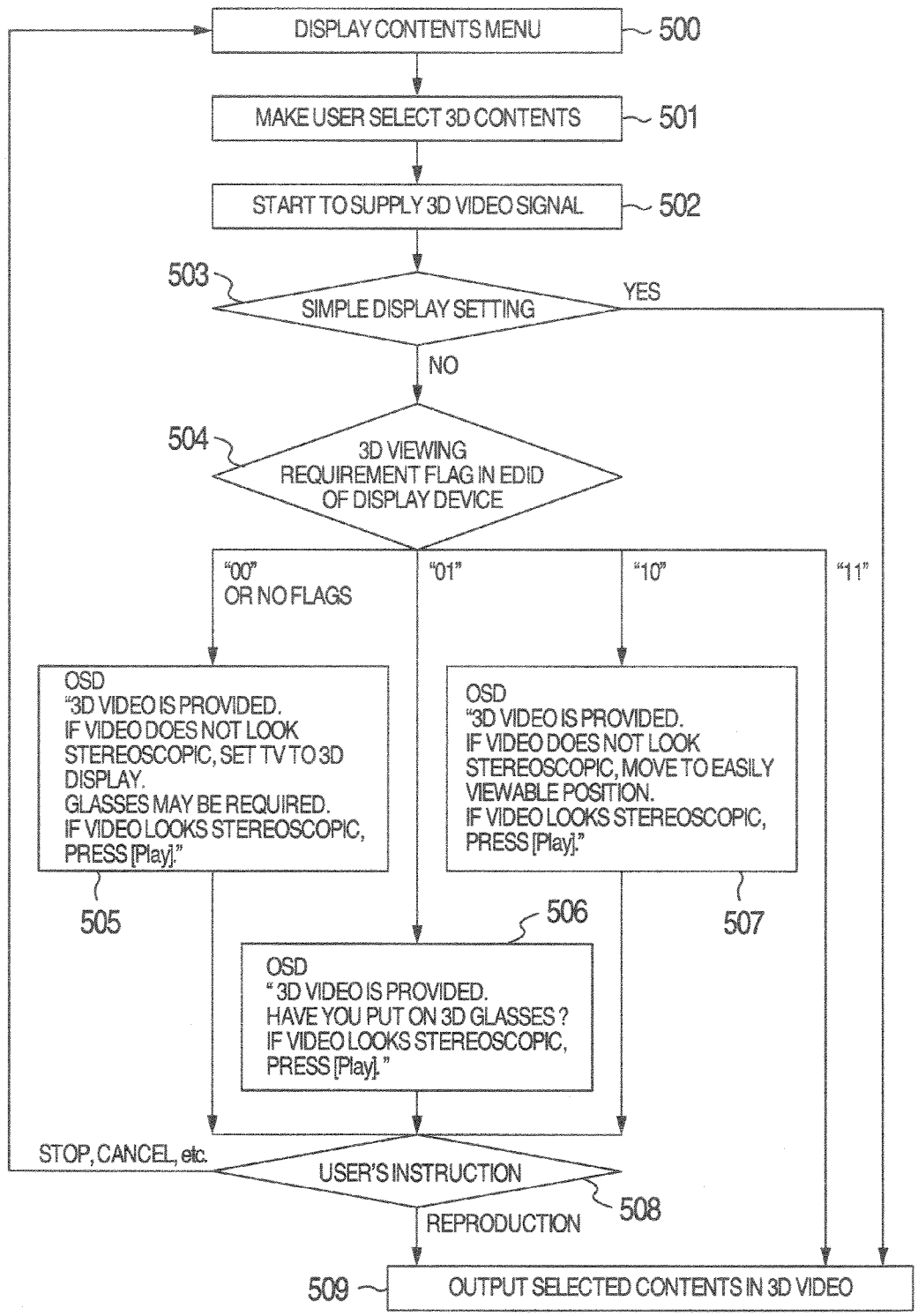
FIG. 4 is a flow chart showing an example of processing in a video transmission system.

Hereafter, embodiments will be described. In the ensuing embodiments, "3D" means 3-dimensional and "2D" means 2-dimensional. For example, "3D video" means a video which makes it possible for the viewer to perceive a certain object stereoscopically as if it exists in the same space as the viewer by presenting videos having parallax to left and right eyes. Furthermore, for example, "3D display device" is a display device capable of displaying a 3D video. Furthermore, for example, "3D contents" are contents containing a video signal which makes it possible to display a 3D video in processing conducted by the 3D display device.

<First Embodiment>

FIG. 1 is a block diagram showing a video transmission system in the present embodiment. A video signal reproducing apparatus 11 is connected to a 3D display device 21 via an HDMI cable 31. The video signal reproducing apparatus 11 is, for example, a DVD player, a DVD recorder, a Blu-ray Disc player, a Blu-ray Disc recorder, an HDD recorder, or the like. The video signal reproducing apparatus 11 includes storage media 111 such as an optical disc, a magnetic recording disc, or a semiconductor memory, a data readout unit 112, a decoding unit 113, an OSD (On Screen Display) generation unit 114, a video signal superimposing unit 115, a control unit 117, an EDID (Extended Display Identification Data) readout unit 118, and a video transmission unit 119. By the way, the recoding media 111 may be incorporated in the video signal reproducing apparatus or attachable/detachable.

In the video signal reproducing apparatus 11, video data which is read out from the recording media 111 by the data readout unit 112 is decoded by the decoding unit 113. The decoded video data and an OSD generated by the OSD generation unit 114 as occasion demands are superimposed by the video signal superimposing unit 115 and output from the video transmission unit 119.

The 3D display device 21 is a display capable of displaying a 3D video. The 3D display device 21 is a display device which includes, for example, a liquid crystal display, a plasma display, an organic EL display or the like. The 3D display device 21 includes a control unit 212, an EDID memory unit 213, a video reception unit 214, and a display unit 217. By the way, the 3D display device 21 may have a configuration including a tuner, a descrambler, a demultiplexer, and a decoder which process a broadcast wave received by an antenna, In the 3D display device 21, video data received by the video reception unit 214 is displayed by the display unit 217.

As a method for displaying a 3D video in the 3D display device 21, there are an anaglyph scheme, a polarization display scheme, a frame sequential scheme, a parallax barrier scheme, a lenticular lens scheme, a microlens array scheme, and a light ray reproducing scheme.

In the anaglyph scheme, videos picked up from different angles on the left and right sides are reproduced respectively with red and green light rays overlapped and the videos are viewed with glasses (hereafter referred to as "anaglyph glasses" as well) having red and blue color filters on the left and right sides.

In the polarization display scheme, orthogonal linear polarizations are applied to left and right videos to conduct overlapped projections and they are separated by using glasses (hereafter referred to as "polarization glasses") having polarization filters.

In the frame sequential scheme, videos picked up from different angles on the left and right sides are reproduced alternately and the videos are viewed with glasses (hereafter referred to as shutter glasses as well) having liquid crystal shutters to shade the left and right fields of vision.

In the parallax barrier scheme, a video for the right eye is viewed with the right eye and a video for the left eye is viewed with the left eye by laying a barrier of a longitudinal stripe called "parallax barrier" on the display. The user need not put on special glasses or the like. The parallax barrier scheme can also be further classified into a two view point scheme in which the viewing position is comparatively narrow and a multiple view point scheme in which the viewing position is comparatively wide.

In the lenticular lens scheme, a video for the right eye is viewed with the right eye and a video for the left eye is viewed with the left eye by laying a lenticular lens on the display. The user need not put on special glasses or the like. The lenticular lens scheme can also be further classified into a two view point scheme in which the viewing position is comparatively narrow and a multiple view point scheme in which the viewing position is comparatively wide.

In the microlens array scheme, a video for the right eye is viewed with the right eye and a video for the left eye is viewed with the left eye by laying a microlens array on the display. The user need not put on special glasses or the like. The microlens array scheme is a multiple view point scheme in which the viewing position is comparatively wide vertically and horizontally.

The light ray reproducing scheme is a scheme in which parallax videos are presented to the viewer by reproducing the wave front of light rays. The user need not put on special glasses or the like. Furthermore, the viewing position is comparatively wide.

By the way, the display scheme of the 3D video is an example, and a scheme other than those described above may be adopted. Furthermore, tools or devices required to view the 3D video, such as the anaglyph glasses, polarization glasses, and shutter glasses are collectively referred to as 3D glasses, 3D viewing devices or 3D viewing assistance devices, The HDMI cable 31 includes a DDC (Display Data Channel) line 312 and a TMDS (Transition Minimized Differential Signaling) line 313.

FIG. 2 shows a form example (hereafter referred to as "3D viewing requirement flag" as well) of information concerning a 3D video signal reception capability of the 3D display device 21 and the display scheme of the 3D video, which is read out from the EDID memory unit 213. In the longitudinal direction, address numbers are shown by taking a byte as the unit. In the lateral direction, configurations are shown by taking a bit of each byte as the unit. Furthermore, in the ensuing embodiments, preparations required to view a 3D video (such as putting on 3D glasses or adjusting the viewing position) are referred to as "3D viewing requirements" as well.

By the way, the EDID is a data for giving and taking information concerning specifications or capability of the display device. In the present embodiment, the video signal reproducing apparatus 11 can conduct processing according to the capability of the 3D display device 21 by reading out the EDID of the 3D display device 21.

Based on "High-Definition Multimedia Interface Specification Version 1.4a Extraction of 3D Signaling Portion," published by HDMI, LLC, http://www.hdmi.org/manufacturer/specification.aspx, bytes 0 to 3 indicate HDMI-VSDB (Vender Specific Data Block) and definition of the 3D video signal reception capability begins from pth byte. Bits 2 and 1 of the pth byte, which are not used as a reserved area (Reserved (0)) in "High-Definition Multimedia Interface Specification Version 1.4a Extraction of 3D Signaling Portion," published by HDMI, LLC, http://www.hdmi.org/manufacture/specification.aspx, are newly named "Condition_to_see_3D" as a description place of the 3D viewing requirement flag of the 3D display device 21.

Describing the 3D viewing requirement flag in the same block as the block describing a 3D format structure which can be received by the 3D display device brings about an effect that it becomes easier for the video signal reproducing apparatus 11 to read out information relating to the 3D display of the 3D display device collectively. Furthermore, utilizing the reserved area brings about an advantage that it becomes unnecessary to secure a new storage area and an LSI conventionally used to store the EDID can be utilized. A table which indicates contents of the 3D viewing requirement flag is shown in FIG. 3.

The 3D viewing requirement flag shown in FIG. 3 has meaning of four kinds represented by a combination of two bits. Since a device corresponding to "High-Definition Multimedia Interface Specification Version 1.4a Extraction of 3D Signaling Portion," published by HDMI, LLC, http://www.hdmi.org/manufacturer/specification.aspx uses "00" as the reserved area, "00" is defined to have no information concerning the viewing requirements with backward compatibility taken into consideration. And "01" indicates that special glasses are required for 3D viewing (for example, a 3D display device which conducts 3D display in the frame sequential scheme). And "10" indicates an autostereoscopic scheme which does not require special glasses and that the viewing range is comparatively narrow (for example, a 3D display device which conducts 3D display according a two view point scheme in the parallax barrier scheme or the lenticular lens scheme). And "11" indicates an autostereoscopic scheme which does not require special glasses and that the viewing range is comparatively wide (for example, a multiple view point (for example, an eight view point) scheme in the parallax barrier scheme, the lenticular lens scheme, or the microlens array scheme, or a 3D display device which conducts 3D display in the tracking scheme which follows the eye position even with two view points or the light ray reproduction scheme).

It is also possible to suitably change the meaning indicated by a combination of the two bits as occasion demands. In the case where the 3D viewing requirement flag is "01," information indicating the kind of required glasses may be provided in another area to make a difference among anaglyph glasses, polarization glasses, and shutter glasses discriminable.

Processing in the video signal reproducing apparatus 11 will now be described with reference to an operation flow chart shown in FIG. 4.

(Step 500): If the user inserts the storage media 111 such as an optical disc having video data recorded thereon into the video signal reproducing apparatus 11 or the user instructs to reproduce contents from the storage media 111 such as an incorporated hard disc, then the OSD generation unit 114 generates a contents menu and the contents menu is sent to the 3D display device 21 via the video signal superimposing unit 115, the video transmission unit 119 and the TMDS line 313 in the HDMI cable 31. In the 3D display device 21, the video reception unit 214 receives the contents menu and the display unit 217 displays the contents menu.

(Step 501): The user selects 3D contents from the contents menu. In this example, it is supposed that a 2D video signal is let flow through the TMDS line 313 and the display unit 217 conducts the 2D display. However, the contents menu may be provided by using a 3D video signal.

(Step 502): The video transmission unit 119 in the video signal reproducing apparatus 11 outputs a video signal having a 3D video format. Upon receiving the video signal, the video reception unit 214 in the 3D display device 21 judges the video to be a 3D video and switches the display unit 217 to 3D display via the control unit 212.

(Step 503): The user feels troublesome in some cases about a 3D display guide which will be described with reference to step 504 and subsequent steps. In an alternative configuration, therefore, "simple display setting" is provided in a device setting menu of the video signal reproducing apparatus 11 and if it is set, then steps 504 to 506 are skipped and the processing proceeds to step 509 at which 3D video outputting of the selected contents is started (the step 503 may be omitted).

(Step 504): Subsequent processing is judged on the basis of the 3D viewing requirement flag ("Condition_to_see_3D" shown in FIG. 2) which is read out from the EDID memory unit 213 in the 3D display device 21 by the EDID readout unit 118 in the video signal reproducing apparatus 11 through the DDC line 312 in the HDMI cable 31. If the 3D viewing requirement flag is "00," the processing proceeds to step 505. If the 3D viewing requirement flag is "01," the processing proceeds to step 506. If the 3D viewing requirement flag is "10," the processing proceeds to step 507. If the 3D viewing requirement flag is "11," the processing proceeds to the step 509. If the 3D viewing requirement flag is "11," i.e., in the case of the autostereoscopic scheme in which the viewable range is wide, then 3D glasses are not required to view the 3D video and consequently the processing proceeds to the step 509 at which 3D video outputting of the selected contents is started, without displaying a message to the user.

By the way, the readout of the 3D viewing requirement flag from the EDID memory unit 213 may be conducted immediately before the step 504. Or the 3D viewing requirement flag read out from the 3D display device and stored in the video signal reproducing apparatus 11 beforehand may be read out at the step 504. Owing to the configuration in which the 3D viewing requirement flag is read out immediately before the step 504, an advantage that guide display can be conducted on the basis of the latest state even if the state of the display unit 217 has changed is brought about.

(Step 505): If the viewing requirement flag is "00," i.e., there is no information concerning the 3D viewing requirement, or missing the viewing requirement flag, then the OSD generation unit 114 generates a wide-ranging guide screen which guides the user to setting the TV to 3D display when 3D is not visible and which informs the user that glasses are required in some cases, and causes the display unit 217 to conduct guide display via the video signal compounding unit 115, the video transmission unit 119, and the video reception unit 214.

(Step 506). If the viewing requirement flag is "01," i.e., glasses are required, then a display which guides the user to putting on glasses, such as a message "have you put on glasses?" is conducted. Operation ranging from OSD generation in the guide screen to display in the display unit is conducted in the same way as the step 505, and its description will be omitted. By the way, if there is information which can specify the kind of 3D glasses, a configuration in which the kind of glasses such as anaglyph glasses, polarization glasses, shutter glasses, or the like is specified and displayed may be formed. Furthermore, if 3D glasses are not required, information which specifies a scheme such as the parallax barrier scheme or the light ray reproducing scheme may be provided in another area.

(Step 507): If the viewing requirement flag is "10," i.e., in the case of the autostereoscopic scheme in which glasses are not required but the viewing range is narrow, display which guides the user to moving to a position where viewing is easy is conducted. Operation ranging from OSD generation in the guide screen to display in the display unit is conducted in the same way as the step 505, and its description will be omitted.

(Step 508): If a user's instruction (an instruction given by depressing a button on a remote controller) is "contents reproducing," then the processing proceeds to the step 509. If the user's instruction is "contents reproducing stop," "cancel" or the like, the processing returns to the step 500. By providing this step, it becomes possible to start contents reproducing (step 509) after the user recognizes the guides displayed at the steps 505 to 507 and completes preparations for viewing the 3D video (such as preparation of 3D glasses).

(Step 509): After the data readout unit 112 reads out selected contents from the storage media 111 and the decoding unit 113 decodes the selected contents and begins to output a 3D non-compressed video signal onto the TMDS line 313 via the video signal compounding unit 115 and the video transmission unit 119. In the 3D display device 21, the video reception unit 214 receives the 3D non-compressed video signal and the display unit 217 displays a 3D video.

In this way, the 3D viewing requirement of the 3D display device 21 is obtained through the line included in the HDMI cable 31 which transmits the video signal. When starting the 3D viewing, therefore, the video signal reproducing apparatus 11 can display a suitable guide to the user without preparing a special communication line. The present embodiment has been described by taking the HDMI as an example. However, the present embodiment can be applied no matter whether the connection is wired or wireless as long as the interface has communication lines capable of transmitting the video signal and the capability of the display device. For example, it can be applied to the DVI (Digital Visual Interface), DiiVA (Digital Interface for Video and Audio), or the like. Ensuing embodiments can also be applied to the other interfaces.

The 3D viewing guide display has been shown as an example. However, similar effects can be obtained even if a guide voice is transmitted to the 3D display device 21. In the ensuing embodiments as well, the guide voice may be used instead of the guide display.

<Second Embodiment>

FIG. 5 shows another definition example of the 3D viewing requirement flag "Condition_to_see_3D." The block diagram shown in FIG. 1 and the information configuration table shown in FIG. 2 are common to the first embodiment.

In FIG. 5, "00" is defined to have no information concerning the viewing requirements with backward compatibility taken into consideration in the same way as FIG. 3. And "01" indicates that 3D glasses are not required, but it is necessary to manually change over the display mode of the 3D display device 21 from the 2D to the 3D. And "10" indicates that neither 3D glasses nor a display mode change is required at the time of 3D viewing as in the case of for example, the parallax barrier scheme. And "11" indicates that 3D glasses are required.

Figure 6:
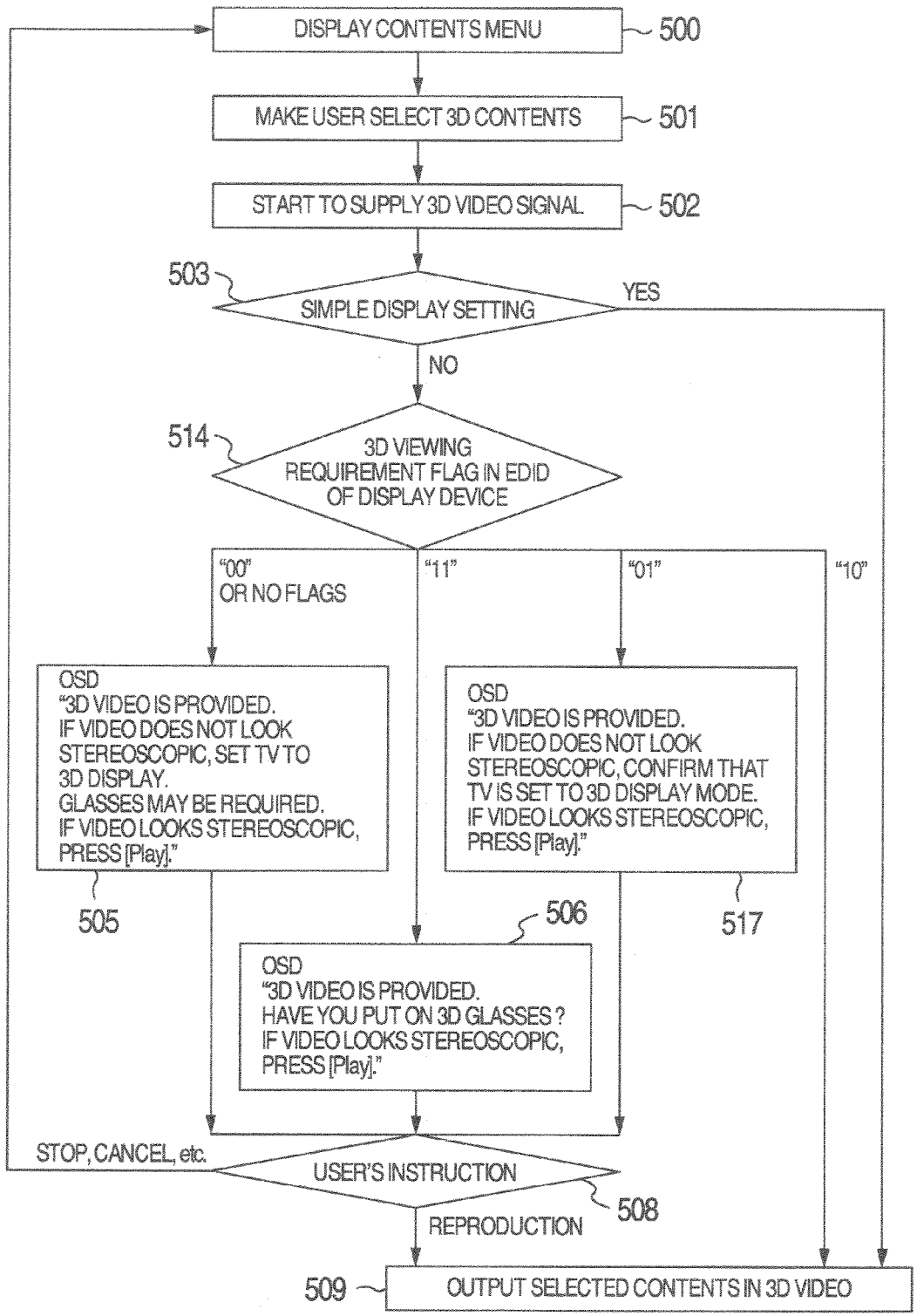
FIG. 6 is a flow chart showing an example of processing in a video transmission system.

FIG. 6 is an operation flow chart. FIG. 6 differs from FIG. 4 in conditional branches of the step 514 and OSD display contents at step 517. Other steps are provided with the same numbers.

If it is indicated by "01" at the step 514 that the 3D display device requires changeover setting from the 2D display mode to the 3D display mode, then a guide is displayed at the step 517 to prompt the user to confirm setting of the 3D display mode. Even if a display device for which the user needs to change over the display mode manually when viewing a 3D video is connected to the video signal reproducing apparatus 11, therefore, it becomes possible to prompt the user to change over the display mode of the display device.

This OSD message is similar to that in the case where there is no information represented by "00," Therefore, the state of "01" may be omitted to conduct the same processing as that in the case of "00."

<Third Embodiment>

FIG. 7 shows another embodiment of a form of information concerning the 3D video signal reception capability and the 3D display scheme. FIG. 7 differs from FIG. 2 in that one byte in the (q+1)-st byte is secured for the 3D viewing requirement flag "3D_Display" and a flag "3D_Display_present" which indicates presence of the 3D viewing requirement flag "3D_Display" is provided in bit 2 of the pth byte. Bit 1 and bit 0 in the pth byte can be left "Reserved" for future expansion.

FIG. 8 shows a definition example of the 3D viewing requirement flag "3D_Display" and the flag "3D_Display_present" which indicates presence thereof. In the display device described in "High-Definition Multimedia Interface Specification Version 1.4a Extraction of 3D Signaling Portion," published by HDMI, LLC, http://www.hdmi.org/manufacturer/specification.aspx, the flag "3D_Display_present" is "0" and the 3D viewing requirement flag "3D_Display" does not exist. As a result, features of the backward compatibility can be maintained.

Bit 7 in the 3D viewing requirement flag "3D_Display" is a glass requirement "Glasses." If 3D glasses are required to view a 3D video, the bit 7 is set to "1." If 3D glasses are not required in, for example, the parallax barrier scheme or the like, the bit 7 is set to "0." By the way, in the case where 3D glasses are required, information identifying the kind of the 3D glasses may be provided in another area. In the case where 3D glasses are not required, information which identifies a scheme such as the parallax barrier scheme or the light ray reproducing scheme may be provided in another area.

Bits 6 and 5 in the 3D viewing requirement flag "3D Display" indicate a multiple view point requirement "Multi View" in the parallax barrier scheme. And "00" indicates binocular parallax or less than four view points, "01" indicates four to seven view points, "10" indicates eight to fifteen view points, and "11" indicates sixteen or more view points. In this way, it is indicated that the number of view points can be increased in order and the viewing range can be expanded.

Bits 4 and 3 represent "Valid_3D_display" which indicates the current 2D/3D display state in real time. And "00" indicates that the current 2D/3D display state is unknown or the real time description is impossible. And "01" indicates that changeover to the 3D display state is conducted whenever a video signal of the 3D format is input. And "10" indicates that even if a video signal of the 3D format is input when the 3D display device 21 is in a state in which a 2D video is displayed, changeover to the state in which a 3D video is displayed is not conducted and the 3D display device 21 remains in the state in which a 2D video is displayed. And "11" indicates that the 3D display device 21 is in a state in which a 3D video is displayed if a video signal of the 3D format is input thereto. If the 3D display device is changed over between the 2D video display state and the 3D video display state, then "10" and "11" reflect the display state of the 3D display device in real time when a 3D video is input.

Bits 2, 1 and 0 are reserved and set to "000" for future expansion.

The present embodiment has a configuration similar to that of the system block diagram shown in FIG. 1 and described in the first embodiment. Operation of the present embodiment is similar to that shown in the flow chart of FIG. 4. The operation of the present embodiment differs from that shown in the flow chart of FIG. 4 in the conditional branches at the step 504 and how their guide displays are conducted. If "3D_display_present" is "0," then the 3D viewing requirement flag "3D_display_present" is not present and consequently the processing proceeds to step 505.

If "3D_display_present" in the EDID of the 3D display device is "1," the video signal reproducing apparatus 11 outputs a guide display according to parameters "Glasses," "Multi_view," and "Valid_3D_display." For example, if "Glasses" is "1," the video signal reproducing apparatus 11 outputs a display having contents "have you put on 3D glasses?" If "Glasses" is "0," the video signal reproducing apparatus 11 does not output a display concerning 3D concerning 3D glasses.

It is now supposed that "Glasses" is "0" to indicate a scheme in which 3D glasses are not required. If "Multi_view" is "00" to indicate three view points or less, then the video signal reproducing apparatus 11 outputs a display having contents "since the 3D viewing range is narrow, choose an optimum viewing place." If "Multi_view" is "01" to indicate a range of four to seven view points, then the video signal reproducing apparatus 11 outputs a display having contents "since the 3D viewing range is slightly narrow, choose an optimum viewing place." If "Multi_view" is "10" to indicate a range of eight to fifteen view points, then the video signal reproducing apparatus 11 outputs a display having contents "if there is a sense of incompatibility to the 3D video display, move the eye position slightly." If "Multi_view" is "11" to indicate sixteen or more view points, then the video signal reproducing apparatus 11 does not output a guide display. For example, if the viewing position is tracked and automatic adjustment is conducted to optimize the 3D video, it is possible to set "11."

If "Glasses" is "1," typically the number of view points is two, and consequently "Multi_view" becomes "00." If the 3D display device 21 has a function of tracking the position of 3D glasses and automatically adjusting the video signal, "01," "10," and "11" may indicate the number of distinguished positions of the 3D glasses.

If "Valid_3D_disaplay" is "00" and the current 2D/3D display state is unknown, then the video signal reproducing apparatus 11 should output a display having contents "confirm whether the display device is set to the 3D display mode. If "Valid_3D_disaplay" is "01" to always conduct 3D display or "Valid_3D_disaplay" is "11" to set to the 3D display state, then the video signal reproducing apparatus 11 need not conduct the guide display. If "Valid_3D_disaplay" is "10" to indicate that setting to the 3D display state is not conducted, then the video signal reproducing apparatus 11 should output a display having contents "set the display device to the 3D display mode."

If "Valid_3D_disaplay" is "10" or "11," then it is indicated that the EDID description state is reflected in real time. Therefore, a more accurate guide display can be given to the user by reading out the EDID and reflecting the EDID to the guide display when reproduction of the 3D contents is started and whenever the menu is called. If "Valid_3D_disaplay" is "01," then the 3D video display device 21 is changed over to the state in which it displays a 3D video whenever a 3D video signal is input thereto. Therefore, it suffices to read out the EDID once.

<Fourth Embodiment>

Figure 9:
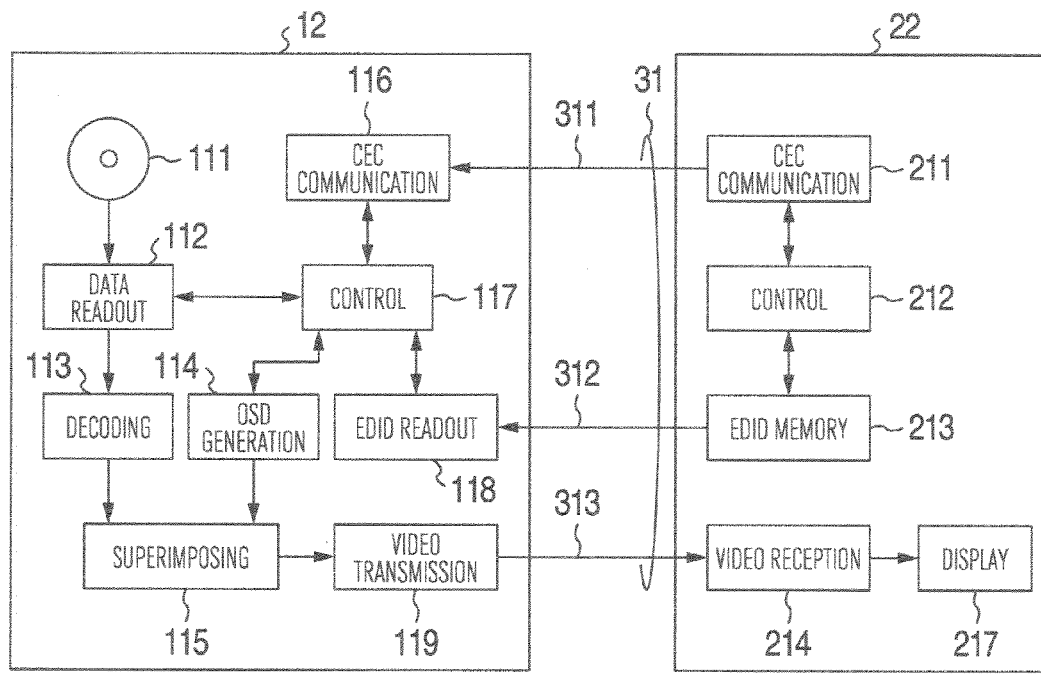
FIG. 9 is a block diagram showing an example of a video transmission system.

FIG. 9 is a block diagram of a video transmission system in the present embodiment. A video signal reproducing apparatus 12 is connected to a 3D display device 22 via the HDMI cable 31. Parts having the same functions as those in the block diagram shown in FIG. 1 are provided with like numbers. Added parts are a CEC (Consumer Electronics Control) communication unit 116 in the video signal reproducing apparatus 12, a CEC communication control unit 211 in the 3D display device 22, and a CEC line 311 in the cable 31.

In the present embodiment, the video signal reproducing apparatus 12 instructs the 3D display device 22 to display a 3D video through the CEC which is the bidirectional communication control function included in the HDMI and the 3D display device 22 conveys the current 3D display state to the video signal reproducing apparatus 12 in real time through the CEC. This results in a feature that a more accurate and intelligible guide display or guide voice is given to the user.

FIG. 11 shows definition examples of messages newly added to the CEC, and FIG. 12 shows definition examples of arguments of the messages. Hereafter, operation in the present embodiment will be described by using an example of transmission and reception of messages shown in FIG. 10.

A user 41 presses a reproducing button on a remote controller of the 3D display device 22. Upon receiving its infrared light, the 3D display device 22 conveys a remote control code [Play] to the video signal reproducing apparatus 12 by using a <User Control Pressed>

[Play] message. The video signal reproducing apparatus 12 supplies an OSD of a 3D video or a first video signal of 3D contents in the 3D format. At the same time, the video signal reproducing apparatus 12 sends an <Activate 3D display mode> ["3D"] message to the 3D display device 22 to request changeover to the 3D display state.

If the 3D display device 22 requested to change over to the 3D display state is in the 2D display state, then the 3D display device 22 begins to shift to the 3D display state. If it is necessary to cause the user to put on 3D glasses, however, then the 3D display device 22 replies to the video signal reproducing apparatus 12 with a <Report 3D display mode> ["Need glasses"] ["0"] ["3D"] ["Wait"] message to convey the state and cause the video signal reproducing apparatus 12 to wait to reproduce 3D contents.

Even if the scheme requires 3D glasses, the 3D display device 22 is already in the 3D display state and the user is judged to wear 3D glasses in some cases. In this case, the 3D display device 22 may reply to the video signal reproducing apparatus 12 with a <Report 3D display mode> ["Need glasses"] ["0"] ["3D"] ["No Error"] message although not illustrated, and the video signal reproducing apparatus 12 may immediately start the reproduction of 3D contents.

Upon being instructed to wait to reproduce 3D contents, the video signal reproducing apparatus 12 sends a video signal for guide display or a voice signal for guide voice such as "put on 3D glasses" to the 3D display device 22 because the scheme is the 3D display scheme which requires 3D glasses. The 3D display device 22 provides the user 41 with a guide screen or a guide voice.

The user 41 is ready for 3D viewing and presses [Play] on the remote controller. Upon receiving its infrared light, the 3D display device 22 conveys the remote control code [Play] to the video signal reproducing apparatus 12 with a <User Control Pressed> ["Play"] message. The video signal reproducing apparatus 12 starts reproduction of 3D contents and outputs a 3D video signal to the 3D display device 22.

Upon detecting that the user has put on glasses by using a sensor attached to glasses or a camera which grasps the user state, the 3D display device 22 may shift to the 3D display state and send <Report 3D display mode> ["Need glasses"] ["0"] ["3D"] ["No Error"] which means preparation completion.

The description has been made by taking the case of a display device which requires 3D glasses as an example. According to the definition table shown in FIG. 12, however, a guide display or a guide voice for suitable 3D viewing can be provided and a guide display or a guide voice which is suitable to the user can be implemented even in the case of a scheme which does not require 3D glasses or the case where 2D/3D changeover display is possible, because the video signal reproducing apparatus 12 can grasp the 3D display scheme in the 3D display device 22 and the current 2D/3D changeover state.

Furthermore, if an apparatus corresponds to both processing using the CEC communication in the present fourth embodiment and processing using the EDID in the first to third embodiments, there is an advantage that an operational environment which can be used conveniently by the user can be provided even in the case where a connected device corresponds to only either processing.

<Fifth Embodiment>

Figure 13:
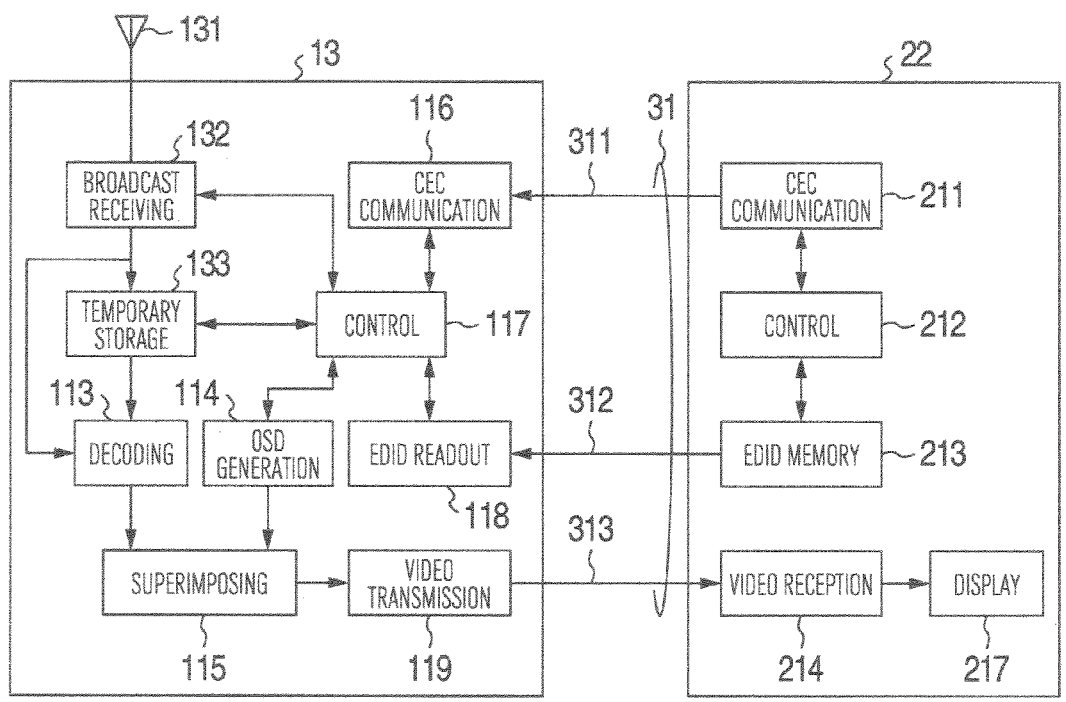
FIG. 13 is a block diagram showing an example of a video transmission system.

FIG. 13 is a block diagram of a video transmission system in the present embodiment. A video signal reproducing apparatus 13 which can receive a broadcast and the 3D display device 22 are connected to each other via the HDMI cable 31. Parts having the same functions as those in the block diagram shown in FIG. 9 are provided with like numbers.

The storage media 111 and the data readout unit 112 in FIG. 9 are replaced by a broadcast receiving unit 132 connected to an antenna 131 which receives a broadcast radio wave and a temporary storage unit 113 which temporarily stores data received by the broadcast receiving unit 132.

If preparations (such as, for example, putting on 3D glasses or adjusting the viewing position) for viewing a 3D video are required, it is desirable for the user to wait to reproduce 3D contents until the preparations are complete. In other embodiments, after display concerning the 3D viewing requirement is conducted, an instruction to reproduce given by the user is waited for to reproduce 3D contents. In the case where 3D contents are received and reproduced via a broadcast wave, however, reproducing the contents cannot be stopped temporarily. Therefore, there is a fear that a beginning part of the 3D contents might be overlooked while making preparations for viewing the 3D contents.

Figure 15:
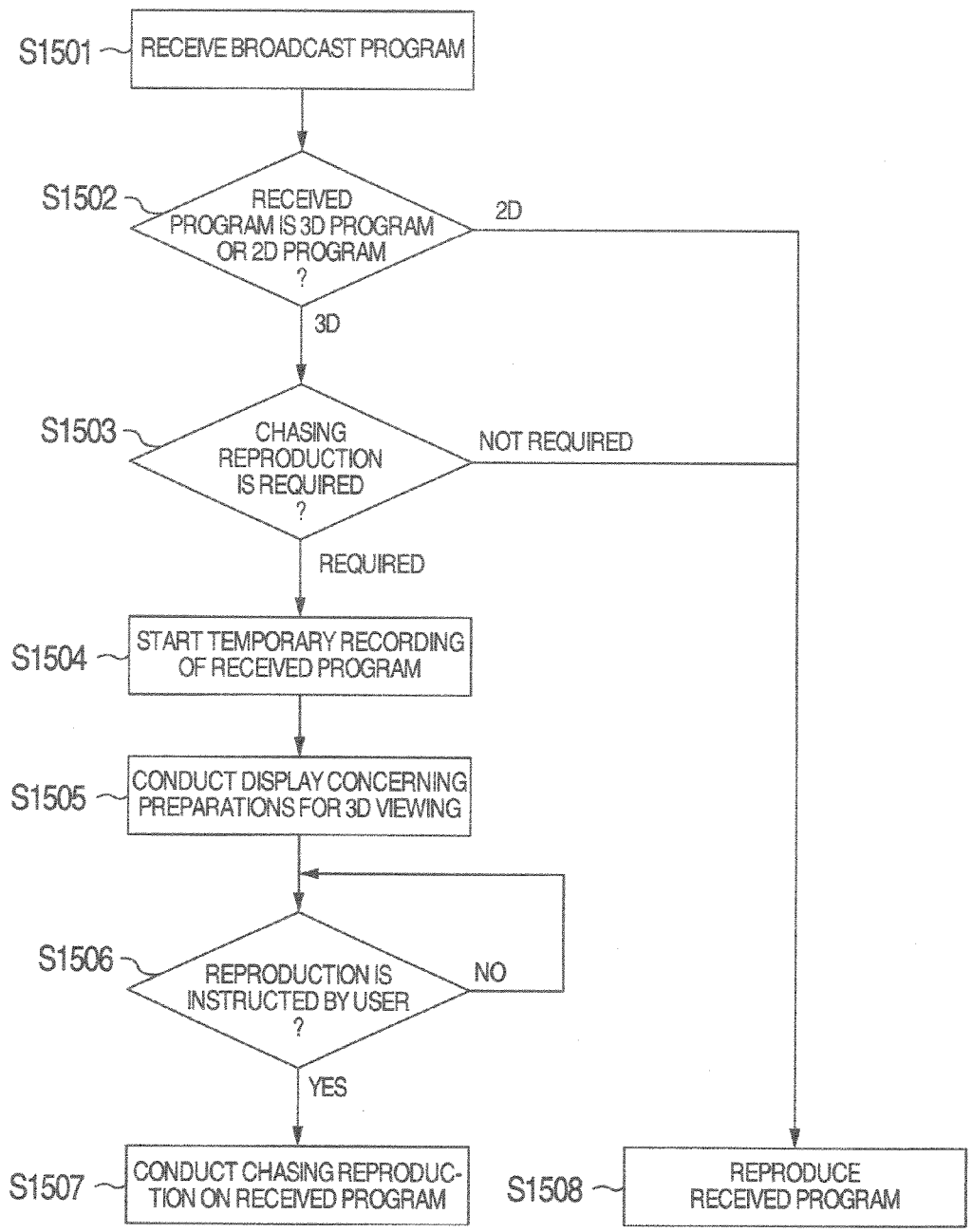
FIG. 15 is a flow chart showing an example of processing in a video transmission system.

Therefore, the present embodiment is configured to make it possible to view 3D contents from the beginning by providing the temporary storage unit 133, temporarily storing 3D contents received via a broadcast wave until the 3D viewing requirement is satisfied and conducting time shift reproduction after the 3D viewing requirement is satisfied. Hereafter, an example of processing in the present embodiment will be described with reference to FIG. 15.

At step 1501, the broadcast receiving unit 132 conducts reception processing of a broadcast program via the antenna 131. At step 1502, a decision is made whether the broadcast program subjected to the reception processing in the broadcast receiving unit 132 is 3D contents or 2D contents.

If the broadcast program is judged to be 2D contents at the step 1502, then the processing proceeds to step 1508 and the received broadcast program is reproduced.

If the broadcast program is judged to be 3D contents at the step 1502, then the processing proceeds to step 1503 and a decision is made whether the 3D contents are contents which require chasing reproduction (time shift reproduction). For example, in the case of broadcast contents in which the real time property is made much of such as news and on-the-spot broadcasting, there is also a possibility that users who think that the chasing reproduction is unsuitable will exist. The decision whether chasing reproduction is necessary may be adapted to be conducted on the basis of a genre of the program identified from, for example, meta data or the like contained in the broadcast program. (For example, if the genre of the program is news, chasing reproduction is judged to be unnecessary) By the way, "chasing reproduction" means reproducing while recording a broadcast program.

If chasing reproduction is judged at the step 1503 to be unnecessary, then the received broadcast program is reproduced intact. By the way, a configuration in which a guide concerning the 3D viewing requirement is displayed concurrently with reproduction of the broadcast program may be formed.

If chasing reproduction is judged at the step 1503 to be necessary, then the processing proceeds to step 1504 where recording of the received program into the temporary storage unit 133 is started, and the processing proceeds to step 1505.

At step 1505, guide display concerning the 3D viewing requirement is conducted and the processing proceeds to step 1506. Contents of the guide display can be determined according to a method described in other embodiments (with reference to, for example, the flow in FIG. 4 or 6).

At step 1506, a decision is made whether an instruction of reproduction is given by the user. If an instruction of reproduction is given by the user, the processing proceeds to step 1507 and reproduction of the contents recorded in the temporary storage unit 133 is started.

Among the steps described above, the step 1503 may be omitted. Furthermore, the step 1504 and the step 1505 may be inverted in the order or may be conducted at the same time.

Furthermore, the step 1504 and the step 1503 may be inverted in the order. In this case, if the received program is 3D contents, temporary storage is started and then a decision is made whether chasing reproduction is necessary. Furthermore, in this case, if chasing reproduction is judged to be unnecessary the received program may be reproduced, or chasing reproduction may be started without waiting for a reproduction order from the user.

In the present embodiment, the configuration in which the temporary storage unit 133 is provided has been described. In an alternative configuration, however, internal or exterior recording media for recording contents are provided and chasing reproduction is conducted by using the recording media.

Even if the user is not ready for viewing a 3D video when 3D contents are received via a broadcast wave, it becomes possible in the present embodiment to view the 3D video from the beginning of the received 3D contents by conducting chasing reproduction on the received 3D contents.

It is also possible to form a configuration in which the temporary storage unit 133 is not provided and upon receiving 3D contents guide display concerning the 3D viewing requirement is conducted (guide display determined according to a method described in other embodiments (with reference to, for example, a flow chart shown in FIG. 4 or 6). In this case, there is a feat that a video of the beginning part of the received 3D contents might not be able to be viewed as a 3D video. However, it becomes possible to inform the user that the received contents are 3D contents.

If the time when 3D contents are broadcast can be identified on the basis of information in, for example, an electronic program table (EPG), it is possible to form a configuration in which a guide concerning a 3D viewing requirement determined according to a method described in other embodiments (with reference to, for example, a flow chart shown in FIG. 4 or 6) is displayed a predetermined time before (for example, five minutes before) the time when 3D contents are broadcast. In this case, it becomes possible to view the 3D video from the beginning of the received 3D contents even if the temporary storage unit 133 is not provided.

The present embodiment has been described by taking transmission of contents using the broadcast wave as an example. However, the present embodiment is not restricted to this. Even in the broad cast using another method, such as, for example, broadcast utilizing an Internet line (IP broadcast), similar effects are obtained.

<Sixth Embodiment>

Figure 14:
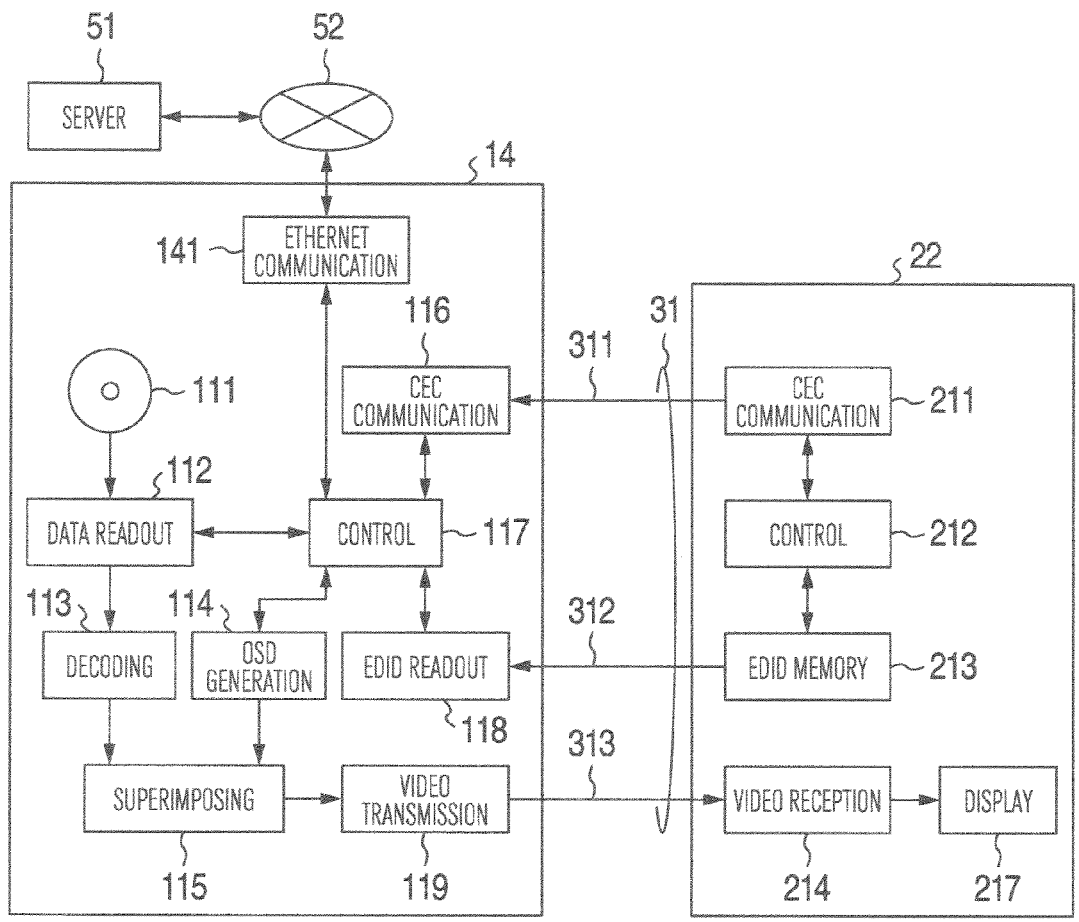
FIG. 14 is a block diagram showing an example of a video transmission system.

FIG. 14 is a block diagram of a video transmission system in the present embodiment. A video signal reproducing apparatus 14 which includes an Ethernet (registered trademark) communication unit 141 and which can access a server storing information concerning a 3D display device through a communication network 52 such as the Internet, and the 3D display device 22 are connected to each other via the HDMI cable 31 Parts having the same functions as those in the block diagram shown in FIG. 9 are provided with like numbers.

In the present embodiment, identification information such as a product type name or product number of the 3D display device 22 is obtained by EDID readout or CEC communication or from registration information into the user setting menu in order to identify the 3D display device 22. And information concerning the 3D viewing requirement of the 3D display device is obtained from a server 51 by using the identification information.

Even if the data area of the EDID is insufficient or the 3D viewing requirement cannot be obtained by the CEC communication, therefore, it becomes possible to obtain information concerning the 3D viewing requirement.

It is also possible to form a configuration in which not only information concerning the 3D viewing requirement of the 3D display device 22 but also data of a guide display or a guide voice of the 3D viewing requirement is obtained from the server. If an inquiry including the identification information such as the product type name or the product number of the video signal reproducing apparatus 14 and identification information of the reproduced 3D contents is sent to the server, guide display and guide voice which can be used by the user conveniently with a combination of them taken into consideration can be implemented.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A video display system comprising:
a reproducing apparatus for reproducing a video signal; and
a display device for displaying the video signal reproduced by the reproducing apparatus, wherein
the display device retains information concerning a 3D video display scheme in the display device,
the information concerning a 3D video display scheme comprises information which indicates whether a 3D viewing device is required to view a 3D video image on the display device, or information concerning a 3D video viewing position,
the reproducing apparatus reads out the information concerning the 3D video display scheme from the display device,
the reproducing apparatus and the display device are separated from, but communicably coupled to, each other, and
when reproducing contents comprising a 3D video, the reproducing apparatus is configured to output video data or voice data concerning a 3D video viewing guide to the display device on the basis of the information concerning the 3D video display scheme read out from the display device.

2. The video display system according to claim 1, wherein the reproducing apparatus is configured to output video data or voice data comprising a guide message which prompts a user to utilize the 3D viewing device to the display device on the basis of the information concerning the 3D video display scheme read from the display device.

3. The video display system according to claim 1, wherein the reproducing apparatus is configured to output video data or voice data including a guide message concerning the 3D video viewing position to the display device on the basis of the information concerning the 3D video display scheme read from the display device.

4. The video display system according to claim 1, wherein after outputting the video data or the voice data, the reproducing apparatus stops reproduction of contents until contents reproduction is instructed by a user.

5. A reproducing apparatus for reproducing a video signal and outputting the reproduced video signal to a display device, wherein
when reproducing contents comprising a 3D video, the reproducing apparatus is configured to read out information concerning a 3D video display scheme from the display device and to output video data or voice data concerning a 3D video viewing guide to the display device on the basis of the information concerning the 3D video display scheme read out from the display device,
the information concerning a 3D video display scheme comprises information which indicates whether a 3D viewing device is required to view a 3D video image on the display device, or information concerning a 3D video viewing position, and
the reproducing apparatus and the display device are separated from, but communicably coupled to, each other.

6. The reproducing apparatus according to claim 5, wherein
the reproducing apparatus is configured to output video data or voice data comprising a guide message which prompts a user to utilize the 3D viewing device to the display device on the basis of the information concerning the 3D video display scheme read from the display device.

7. The reproducing apparatus according to claim 5, wherein
the reproducing apparatus is configured to output video data or voice data including a guide message concerning the 3D video viewing position to the display device on the basis of the information concerning the 3D video display scheme read from the display device.

8. The reproducing apparatus according to claim 5, wherein after outputting the video data or the voice data, the reproducing apparatus stops reproduction of contents until contents reproduction is instructed by a user.

9. A reproducing apparatus comprising:
a receiving unit for receiving contents;
a recording unit for recording the received contents;
a decoding unit for decoding contents received by the receiving unit or contents recorded in the recording unit;
an output unit for outputting contents decoded by the decoding unit to a display device; and
a readout unit for reading out information concerning a 3D video display scheme from the display device, wherein:
if contents received by the receiving unit is 3D contents including a 3D video, the received contents are recorded in the recording unit, and video data or voice data concerning a 3D video viewing guide is output to the display device on the basis of the information concerning the 3D video display scheme read out by the readout unit, and
upon receiving a contents reproduction instruction from a user, contents recorded in the recording unit is decoded by the decoding unit and the decoded contents is output from the output unit to the display device, and
the reproducing apparatus and the display device are separated from, but communicably coupled to, each other.

10. The reproducing apparatus according to claim 9, wherein, if the 3D contents are contents in a predetermined genre, then contents received by the receiving unit are decoded by the decoding unit and the decoded contents are output from the output unit to the display device.

\* \* \* \* \*